United States Patent
Ichinose (10) Patent No.: US 11,165,946 B2
(45) Date of Patent: Nov. 2, 2021

(54) IMAGING APPARATUS, LENS APPARATUS, CAMERA SYSTEM, AND CONTROL METHOD OF IMAGING APPARATUS THAT PERFORM EXPOSURE CONTROL

(71) Applicant: CANON KABUSHIKI KAISHA, Tokyo (JP)

(72) Inventor: Masami Ichinose, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/785,961

(22) Filed: Feb. 10, 2020

(65) Prior Publication Data

US 2020/0259992 A1 Aug. 13, 2020

(30) Foreign Application Priority Data

Feb. 13, 2019 (JP) .............................. JP2019-023156
Feb. 13, 2019 (JP) .............................. JP2019-023190

(51) Int. Cl.
*H04N 5/232* (2006.01)
*G03B 7/097* (2021.01)
(Continued)

(52) U.S. Cl.
CPC ......... *H04N 5/23212* (2013.01); *G03B 7/097* (2013.01); *H04N 5/2352* (2013.01); *H04N 5/23296* (2013.01); *G03B 17/14* (2013.01)

(58) Field of Classification Search
CPC ............. H04N 5/23212; H04N 5/2352; H04N 5/23296; H04N 5/2254; H04N 5/23209;
(Continued)

(56) References Cited

U.S. PATENT DOCUMENTS 6,813,442 B2 * 11/2004 Matsuda ................... G03B 3/00
396/91
2002/0071048 A1 * 6/2002 Kaneda ................... H04N 5/238
348/363
(Continued)

FOREIGN PATENT DOCUMENTS

JP   H10268382 A   10/1998
JP   2005062733 A   3/2005

*Primary Examiner* — Gevell V Selby
(74) *Attorney, Agent, or Firm* — Rossi, Kimms & McDowell LLP (57) ABSTRACT

An imaging apparatus includes an imager configured to capture an object image, a photometric unit configured to measure a light amount incident on the imager, an acquisition unit configured to acquire a plurality of data indicating a relationship between the light amount incident on the imager and an adjustment amount set in a light amount adjustment unit in the imaging optical system and adjusts the light amount incident on the imager, and a determination unit configured to determine an exposure condition using the data acquired by the acquisition unit. The plurality of data includes first table data that provides a change amount of the light amount incident on the imager based on a change amount of the adjustment amount, and second table data that provides the change amount of the adjustment amount based on the change amount of the light amount incident on the imager.

20 Claims, 9 Drawing Sheets (51) Int. Cl.
*H04N 5/235* (2006.01)
*G03B 17/14* (2021.01)

(58) Field of Classification Search
CPC .............. H04N 5/235; H04N 5/23287; H04N 5/23258; H04N 5/2351; H04N 5/238; G03B 7/097; G03B 17/14
See application file for complete search history.

(56) References Cited

U.S. PATENT DOCUMENTS

2014/0307124 A1\* 10/2014 Yamashita ............. H04N 5/243
  348/229.1
2016/0286109 A1\* 9/2016 Noda ..................... H04N 5/238

\* cited by examiner

|  | FOCUS 1 | FOCUS 2 | FOCUS 3 | FOCUS 4 | ... | FOCUS 31 | FOCUS 32 |
|---|---|---|---|---|---|---|---|
| F1.0 | T2.2 | T2.2 | T2.3 | T2.3 | ... | T2.9 | T3.0 |
| F1.0+1/16 STEP | T2.2 | T2.3 | T2.3 | T2.4 | ... | T3.0 | T3.1 |
| F1.0+2/16 STEP | T2.3 | T2.3 | T2.4 | T2.5 | ... | T3.1 | T3.2 |
| ... | ... | ... | ... | ... | ... | ... | ... |
| F2.0 | T2.8 | T2.9 | T2.9 | T3.0 | ... | T3.6 | T3.8 |
| ... | ... | ... | ... | ... | ... | ... | ... |
| F4.0 | T4.6 | T4.6 | T4.7 | T4.8 | ... | T5.1 | T5.1 |
| ... | ... | ... | ... | ... | ... | ... | ... |
| ... | ... | ... | ... | ... | ... | ... | ... |
| ... | ... | ... | ... | ... | ... | ... | ... |
| F64 | T64.2 | T64.2 | T64.3 | T64.3 | ... | T64.5 | T64.5 |

FIG. 3

|  | FOCUS1 | FOCUS2 | FOCUS3 | FOCUS4 | ... | FOCUS31 | FOCUS32 |
|---|---|---|---|---|---|---|---|
| F1.0 | T2.2 | T2.2 | T2.3 | T2.3 | ... | T2.9 | T3.0 |
| F1.0+1/16 STEP | T2.2 | T2.3 | T2.3 | T2.4 | ... | T3.0 | T3.1 |
| F1.0+2/16 STEP | T2.3 | T2.3 | T2.4 | T2.5 | ... | T3.1 | T3.2 |
| ... | ... | ... | ... | ... | ... | ... | ... |
| F2.0 | T2.8 | T2.9 | T2.9 | T3.0 | ... | T3.6 | T3.8 |
| ... | ... | ... | ... | ... | ... | ... | ... |
| F4.0 | T4.6 | T4.6 | T4.7 | T4.8 | ... | T5.1 | T5.1 |
| ... | ... | ... | ... | ... | ... | ... | ... |
| ... | ... | ... | ... | ... | ... | ... | ... |
| ... | ... | ... | ... | ... | ... | ... | ... |
| F64 | T64.2 | T64.2 | T64.3 | T64.3 | ... | T64.5 | T64.5 |

| | INFINITY ← FOCUS POSITION → CLOSEST | | | | | | |
|---|---|---|---|---|---|---|---|
| | FOCUS 1 | FOCUS 2 | FOCUS 3 | FOCUS 4 | ... | FOCUS 31 | FOCUS 32 |
| T1.0 | — | — | — | — | — | — | — |
| T1.0+1/16 STEP | — | — | — | — | — | — | — |
| T1.0+2/16 STEP | — | — | — | — | — | — | — |
| ... | ... | ... | ... | ... | ... | ... | ... |
| T2.8 | F2.0 | (F2.1) | T2.1 | F2.2 | ... | F2.4 | F2.5 |
| ... | ... | ... | ... | ... | ... | ... | ... |
| T4.0 | F3.5 | (F3.5) | F3.6 | F3.6 | ... | F3.8 | T3.8 |
| ... | ... | ... | ... | ... | ... | ... | ... |
| ... | ... | ... | ... | ... | ... | ... | ... |
| ... | ... | ... | ... | ... | ... | ... | ... |
| T64 | F63.7 | F63.7 | F63.7 | F63.8 | ... | F63.9 | F63.9 |

(T-NUMBER on vertical axis)

FIG. 6

ZOOM POSITION: WIDE ↔ TELE

| | INFINITY ← FOCUS POSITION → CLOSEST | | | | | | |
|---|---|---|---|---|---|---|---|
| | FOCUS 1 | FOCUS 2 | FOCUS 3 | FOCUS 4 | ... | FOCUS 31 | FOCUS 32 |
| T1.0 | — | — | — | — | — | — | — |
| T1.0+1/16 STEP | — | — | — | — | — | — | — |
| T1.0+2/16 STEP | — | — | — | — | — | — | — |
| ... | ... | ... | ... | ... | ... | ... | ... |
| T2.8 | F2.0 | F2.1 | T2.1 | F2.2 | ... | F2.4 | F2.5 |
| ... | ... | ... | ... | ... | ... | ... | ... |
| T4.0 | F3.5 | F3.5 | F3.6 | F3.6 | ... | F3.8 | T3.8 |
| ... | ... | ... | ... | ... | ... | ... | ... |
| ... | ... | ... | ... | ... | ... | ... | ... |
| ... | ... | ... | ... | ... | ... | ... | ... |
| T64 | F63.7 | F63.7 | F63.7 | F63.8 | ... | F63.9 | F63.9 |

FIG. 7

|  | INFINITY ←——— FOCUS POSITION ———→ CLOSEST | | | | | | |
|---|---|---|---|---|---|---|---|
|  | FOCUS 1 | FOCUS 2 | FOCUS 3 | FOCUS 4 | ... | FOCUS 31 | FOCUS 32 |
| OPEN(F2.0) | T2.8 | T2.8 | T2.9 | T2.9 | ... | T3.2 | T3.3 |
| OPEN+1/16 STEP | T2.8 | T2.9 | T2.9 | T2.9 | ... | T3.3 | T3.3 |
| OPEN+2/16 STEP | ... | ... | ... | ... | ... | ... | ... |
| ... | ... | ... | ... | ... | ... | ... | ... |
| OPEN+16/16 STEP (=F2.8) | T3.2 | T3.2 | T3.3 | T3.3 | ... | T3.6 | T3.6 |
| ... | ... | ... | ... | ... | ... | ... | ... |
| OPEN+32/16 STEP (=F4.0) | T4.6 | T4.6 | T4.7 | T4.8 | ... | T5.1 | T5.1 |
| ... | ... | ... | ... | ... | ... | ... | ... |
| ... | ... | ... | ... | ... | ... | ... | ... |
| ... | ... | ... | ... | ... | ... | ... | ... |
| F32 | T64.2 | T64.2 | T64.3 | T64.3 | ... | T64.5 | T64.5 |

(F-NUMBER)

FIG. 8

|  | INFINITY ←——— FOCUS POSITION ———→ CLOSEST | | | | | | |
|---|---|---|---|---|---|---|---|
|  | FOCUS 1 | FOCUS 2 | FOCUS 3 | FOCUS 4 | ... | FOCUS 31 | FOCUS 32 |
| F1.0 | T2.2 | T2.2 | T2.3 | T2.3 | ... | T2.9 | T3.0 |
| F1.0+1/16 STEP | T2.2 | T2.3 | T2.3 | T2.4 | ... | T3.0 | T3.1 |
| F1.0+2/16 STEP | T2.3 | T2.3 | T2.4 | T2.5 | ... | T3.1 | T3.2 |
| ... | ... | ... | ... | ... | ... | ... | ... |
| F2.0 | T2.8 | T2.9 | T2.9 | T3.0 | ... | T3.6 | T3.8 |
| ... | ... | ... | ... | ... | ... | ... | ... |
| F4.0 | T4.6 | T4.6 | T4.7 | T4.8 | ... | T5.1 | T5.1 |
| ... | ... | ... | ... | ... | ... | ... | ... |
| ... | ... | ... | ... | ... | ... | ... | ... |
| ... | ... | ... | ... | ... | ... | ... | ... |
| F64 | T64.2 | T64.2 | T64.3 | T64.3 | ... | T64.5 | T64.5 |

(F-NUMBER)

FIG. 9

| | | FOCUS 1 | FOCUS 2 | FOCUS 3 | FOCUS 4 | ... | FOCUS 31 | FOCUS 32 |
|---|---|---|---|---|---|---|---|---|
| | OPEN(F2.0) | T2.8 | T2.8 | T2.9 | T2.9 | ... | T3.2 | T3.3 |
| | OPEN+1/16 STEP | T2.8 | T2.9 | T2.9 | T2.9 | ... | T3.3 | T3.3 |
| | OPEN+2/16 STEP | ... | ... | ... | ... | ... | ... | ... |
| | ... | ... | ... | ... | ... | ... | ... | ... |
| | OPEN+16/16 STEP (=F2.8) | T3.2 | T3.2 | T3.3 | T3.3 | ... | T3.6 | T3.6 |
| | OPEN+18/16 STEP | ... | ... | ... | ... | ... | ... | ... |
| | OPEN+20/16 STEP | ... | ... | ... | ... | ... | ... | ... |
| | ... | ... | ... | ... | ... | ... | ... | ... |
| | OPEN+30/16 STEP | ... | ... | ... | ... | ... | ... | ... |
| | OPEN+32/16 STEP (=F4.0) | T4.6 | T4.6 | T4.7 | T4.8 | ... | T5.1 | T5.1 |
| | OPEN+36/16 STEP | ... | ... | ... | ... | ... | ... | ... |
| | OPEN+40/16 STEP | ... | ... | ... | ... | ... | ... | ... |
| | ... | ... | ... | ... | ... | ... | ... | ... |
| | F32 | T64.2 | T64.2 | T64.3 | T64.3 | ... | T64.5 | T64.5 |

INFINITY ←— FOCUS POSITION —→ CLOSEST

F-NUMBER

FIG. 10

INFINITY ← FOCUS POSITION → CLOSEST

| T-NUMBER | | FOCUS 1 | FOCUS 2 | FOCUS 3 | FOCUS 4 | ... | FOCUS 31 | FOCUS 32 |
|---|---|---|---|---|---|---|---|---|
| | OPEN | — | — | — | — | — | — | — |
| | OPEN+1/16 STEP | — | — | — | — | — | — | — |
| | OPEN+2/16 STEP | — | — | — | — | — | — | — |
| | ... | ... | ... | ... | ... | ... | ... | ... |
| | OPEN+16/16 STEP (T2.8) | F2.0 | F2.1 | T2.1 | F2.2 | ... | F2.4 | F2.5 |
| | ... | ... | ... | ... | ... | ... | ... | ... |
| | OPEN+32/16 STEP (=F4.0) | F3.5 | F3.5 | F3.6 | F3.6 | ... | F3.8 | T3.8 |
| | ... | ... | ... | ... | ... | ... | ... | ... |
| | ... | ... | ... | ... | ... | ... | ... | ... |
| | ... | ... | ... | ... | ... | ... | ... | ... |
| | F32 | F63.7 | F63.7 | F63.7 | F63.8 | ... | F63.9 | F63.9 |

FIG. 11

INFINITY ← FOCUS POSITION → CLOSEST

| T-NUMBER | | FOCUS 1 | FOCUS 2 | FOCUS 3 | FOCUS 4 | ... | FOCUS 31 | FOCUS 32 |
|---|---|---|---|---|---|---|---|---|
| | T1.0 | — | — | — | — | — | — | — |
| | T1.0+1/16 STEP | — | — | — | — | — | — | — |
| | T1.0+2/16 STEP | — | — | — | — | — | — | — |
| | ... | ... | ... | ... | ... | ... | ... | ... |
| | T2.8 | F2.0 | (F2.1) | T2.1 | F2.2 | ... | F2.4 | F2.5 |
| | ... | ... | ... | ... | ... | ... | ... | ... |
| | T4.0 | F3.5 | (F3.5) | F3.6 | F3.6 | ... | F3.8 | T3.8 |
| | ... | ... | ... | ... | ... | ... | ... | ... |
| | ... | ... | ... | ... | ... | ... | ... | ... |
| | ... | ... | ... | ... | ... | ... | ... | ... |
| | T64 | F63.7 | F63.7 | F63.7 | F63.8 | ... | F63.9 | F63.9 |

FIG. 12

IMAGING APPARATUS, LENS APPARATUS, CAMERA SYSTEM, AND CONTROL METHOD OF IMAGING APPARATUS THAT PERFORM EXPOSURE CONTROL

BACKGROUND OF THE INVENTION

Field of the Invention

The present invention relates to an imaging apparatus, a lens apparatus, a camera system, and a control method of the imaging apparatus.

Description of the Related Art

Imaging with an imaging optical system having an optical element whose transmittance changes in a radial direction from a center can obtain a blurred image according to the user's preference.

Conventionally, an exposure control is performed by measuring a light amount incident on an image sensor (referred to as "photometry" hereinafter), and by changing an aperture diameter in a diaphragm that adjusts a beam diameter according to the measured light amount. In other words, the exposure control is performed on the premise that linearity is maintained between the aperture diameter of the diaphragm and the light amount incident on the image sensor.

However, when an optical element is used whose transmittance is attenuated from the center to the periphery, the linearity cannot be maintained between the aperture diameter of the diaphragm and the light amount incident on the image sensor. Therefore, in the exposure adjustment that adjusts the light amount by changing the aperture diameter of the diaphragm, the light amount cannot be properly changed based on the instruction of the aperture diameter.

Japanese Patent Laid-Open No. ("JP") 10-268382 discloses an imaging system that enables a filter to be inserted into an optical system to produce a blur effect, selects stored aperture characteristic data according to a type of the attached filter, and changes the aperture control.

The imaging system disclosed in JP 10-268382 stores data indicating a relationship between the aperture driving pulse and the F-number or T-number, and data indicating a relationship between the aperture diameter and the F-number or T-number. However, it does not store data indicating a relationship between the F-number and the T-number, and it takes a long time to convert data when the data is communicated with the F-number in the exposure control. In particular, during continuous imaging, a frame rate may lower due to the conversion between the F-number and the T-number.

SUMMARY OF THE INVENTION

The present invention provides an imaging apparatus, a lens apparatus, a camera system, and a control method of an imaging apparatus, each of which can perform a high-speed exposure control.

An imaging apparatus according to one aspect of the present invention to which a lens apparatus is detachably attached, the lens apparatus including an imaging optical system that includes an optical element whose transmittance changes from a center in a radial direction includes an imager configured to capture an object image formed by the imaging optical system and to output image data, a photometric unit configured to measure a light amount incident on the imager, an acquisition unit configured to acquire a plurality of data indicating a relationship between the light amount incident on the imager and an adjustment amount set in a light amount adjustment unit that is included in the imaging optical system and adjusts the light amount incident on the imager, and a determination unit configured to determine an exposure condition using the data acquired by the acquisition unit. The plurality of data includes first table data configured to provide a change amount of the light amount incident on the imager based on a change amount of the adjustment amount, and second table data configured to provide the change amount of the adjustment amount based on the change amount of the light amount incident on the imager. A control method of the above imaging apparatus also constitutes another aspect of the present invention.

A lens apparatus according to another aspect of the present invention attached to and detachable from an imaging apparatus that includes an imager configured to capture an object image and to output image data, and a photometric unit configured to measure a light amount incident on the imager includes an imaging optical system including an optical element whose transmittance changes from a center in a radial direction, and a light amount adjustment unit configured to adjust a light amount incident on the imager, and a transmitter configured to transmit, to the imaging apparatus, a plurality of data indicating a relationship between an adjustment amount set in the light amount adjustment unit and a light amount incident on the imager. The plurality of data includes first table data configured to provide a change amount of the light amount incident on the imager based on a change amount of the adjustment amount, and second table data configured to provide the change amount of the adjustment amount based on the change amount of the light amount incident on the imager.

A camera system according to another aspect of the present invention includes an imaging optical system including an optical element whose transmittance changes from a center in a radial direction, and a light amount adjustment unit configured to adjust a light amount incident on the imager, an imager configured to capture an object image formed by the imaging optical system and to output image data, a photometric unit configured to measure a light amount incident on the imager, an acquisition unit configured to acquire a plurality of data indicating a relationship between the light amount incident on the imager and an adjustment amount set in the light amount adjustment unit, and a determination unit configured to determine an exposure condition using the data acquired by the acquisition unit. The plurality of data includes first table data configured to provide a change amount of the light amount incident on the imager based on a change amount of the adjustment amount, and second table data configured to provide the change amount of the adjustment amount based on the change amount of the light amount incident on the imager.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. Corresponding elements in respective figures will be designated by the same reference numerals, and a duplicate description thereof will be omitted.

First Embodiment

Figure 1A:
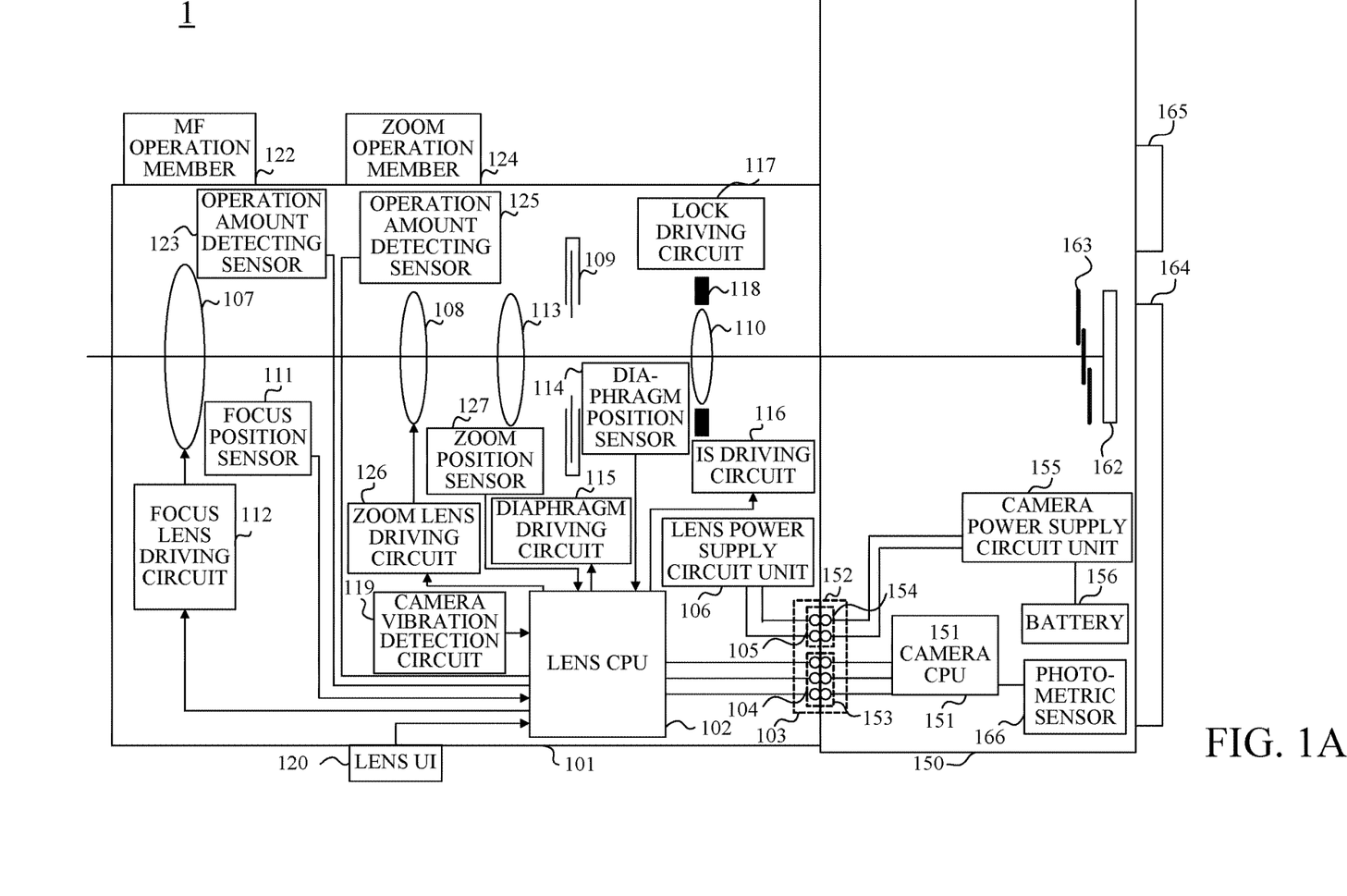
FIGS. 1A to 1C are block diagrams of a camera system according to one embodiment of the present invention.

FIG. 1A is a block diagram of a camera system 1 according to one embodiment of the present invention. The camera system 1 includes a single-lens reflex digital camera (imaging apparatus; referred to as a "camera" hereinafter) 150, and an interchangeable lens (lens apparatus) 101 that is detachably (interchangeably) attached to the camera 150. In the camera system according to this embodiment, the interchangeable lens 101 is detachably attached to the camera 150, but the present invention is also applicable to a lens integrated type camera.

The camera 150 and the interchangeable lens 101 are connected with each other so that they communicate information via a communication contact portion (referred to as "communication terminal" hereinafter) 153 in a camera-side contact portion 152 and a communication contact portion (referred to as a "communication terminal" hereinafter) in a lens-side contact portion 103. The power is supplied from a camera power supply circuit unit 155 to a lens power supply circuit unit 106 via a power supply contact unit 154 in the camera-side contact unit 152 and a power supply contact unit 105 in the lens-side contact unit 103. The camera power supply circuit unit 155 uses the power from a battery 156 in the camera 150 to generate various power supplies used in the camera 150 or to be supplied to the interchangeable lens 101 using an LDO or DCDC circuit.

The interchangeable lens 101 has an imaging optical system including a focus lens unit 107 that moves during focusing, a zoom lens unit 108 that moves during zooming, a diaphragm (aperture stop) 109, and a correction lens (image stabilization lens) 110. The imaging optical system further includes an optical element 113 whose transmittance changes from the center in the radial direction. The optical element 113 is a lens or filter (also referred to as an ND filter or an apodization filter). The aperture diameter of the diaphragm 109 is adjustable by driving. In other words, it functions as a light amount adjuster that adjusts a light amount reaching an image sensor 162. A focus position sensor 111 detects the position (focus position) of the focus lens 107. A focus lens driving circuit 112 drives the focus lens 107. A zoom position sensor 127 detects the position (zoom position) of the zoom lens 108. A zoom lens driving circuit 126 drives the zoom lens 108. The diaphragm 109 adjusts a light amount incident on the image sensor (imager) 162 provided in the camera 150. An aperture position sensor 114 detects the position of the diaphragm 109 (aperture position). Here, the aperture position means an aperture diameter of the diaphragm 109, a driving amount of the diaphragm corresponding to the aperture diameter, and the like. A diaphragm driving circuit 115 drives the diaphragm 109.

An MF operation member 122 is an operation member including a cylindrical shaped manual focus ring that is rotatable around the optical axis of the imaging optical system provided on the exterior of the interchangeable lens 101. An operation amount detecting sensor 123 detects an operation amount of the MF operation member 122. The lens CPU 102 controls the focus lens driving circuit 112 according to the operation amount of the MF operation member 122 detected by the operation amount detecting sensor 123, and drives the focus lens 107 to a predetermined position.

The zoom operation member 124 is an operation member including a cylindrical manual zoom ring that rotates around the optical axis mounted on the exterior of the interchangeable lens 101. An operation amount detecting sensor 125 detects an operation amount of the zoom operation member 124. The lens CPU 102 controls the zoom lens driving circuit 126 according to the operation amount for the zoom operation member 124 detected by the operation amount detecting sensor 125, and drives the zoom lens 108 to a predetermined position.

Figure 1B:
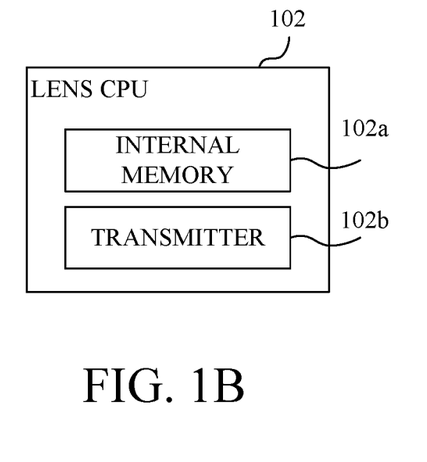

A lens CPU 102 has an internal memory 102a and a transmitter 102b as illustrated in FIG. 1B. The internal memory 102a stores characteristic information and optical information unique to the interchangeable lens 101. The transmitter 102b transmits the characteristic information and optical information stored in the internal memory 102a to a camera CPU 151 via the communication terminals 104 and 153. The characteristic information includes information of the name of the interchangeable lens 101 (ID information for specifying the model type), the maximum communication speed, the open F-number, whether or not it is the zoom lens, an supportable AF system, an AF supportable image height, and table data indicating a relationship between the F-number and the T-number. The optical information includes sensitivity information of the focus lens 107 obtained by a matrix such as a focus position, a zoom position, a state of the diaphragm 109, etc., a focus correction amount (design value), information on a focus correction manufacturing error value, and the like. The transmitter 102b also transmits operation information of the MF operation member 122, a permission signal for permitting driving of the focus lens 107 by the operation of a focus preset driving switch, and the like to the camera CPU 151. The interchangeable lens 101 and the camera 150 communicate information such as an operation state of another configuration, a setting state, various information request commands (transmission requests), and driving commands via the communication terminals 104 and 153.

The interchangeable lens 101 includes a lens user interface (UI) unit 120 that includes an AF/MF selection switch that selects whether to perform autofocusing (AF) or manual focusing (MF) in the focusing operation, and IS_ON/OFF that selects whether to perform a camera shake correction (image stabilization).

Confirming that the AF/MF selection switch selects AF, the camera CPU 151 enters the AF operation. The camera CPU 151 processes the output from the image sensor 162, detects the focus state of the imaging optical system, and calculates the driving amount of the focus lens 107 to obtain the in-focus state on the object based on the optical information acquired from the lens CPU 102. The camera CPU 151 transmits the calculated driving amount of the focus lens 107 to the lens CPU 102 via the communication terminals 104 and 153. The lens CPU 102 controls the focus lens driving circuit 112 according to the focus position information from the focus position sensor 111 and the received driving amount of the focus lens 107, and drives the focus lens 107 to the in-focus position.

Confirming that the AF/MF selection switch selects MF, the camera CPU 151 performs focusing by driving the focus lens 107 to a predetermined position in accordance with the operation amount of the MF operation member 122.

The camera 150 includes a camera user interface unit (operation unit) 161 including a release switch, the image sensor 162, a shutter 163, a display unit 164, a camera user interface unit 165, and a photometric sensor (photometric unit) 166. The image sensor 162 is configured by a photoelectric conversion element, such as a CCD sensor and a CMOS sensor, captures an object image formed by the imaging optical system, and outputs image data. Since the image sensor 162 has such a structure with a plurality of photoelectric converters for one pixel that it can simultaneously output the phase difference signal and the video (image) signal. The display unit 164 displays information indicating an imaging mode (such as a still image capturing mode, a motion image capturing mode, an aperture priority mode, and a shutter speed priority mode) and an imaging condition. A photometric sensor 166 measures the light amount incident on the image sensor 162.

Figure 1C:
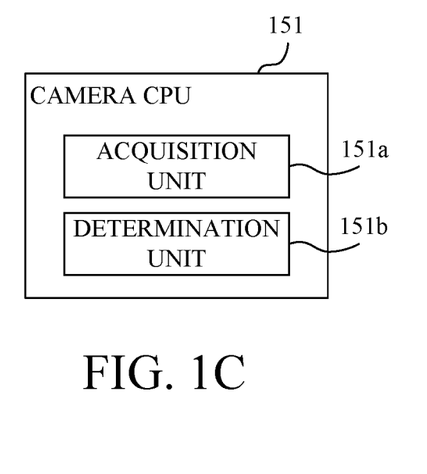

The camera CPU 151 includes an acquisition unit 151*a* and a determination unit 151*b*, as illustrated in FIG. 1C. The acquisition unit 151*a* acquires information transmitted from the lens CPU 102 including a plurality of table data indicating the relationship between the F-number and the T-number. In response to a half-press operation of the release switch, the determination unit 151*b* determines an exposure condition (F-number, shutter speed, and sensitivity) from a plurality of table data indicating the photometric result of the photometric sensor 166, an imaging setting condition, and the relationship between the F-number and the T-number.

The camera CPU 151 transmits the F-number (adjustment amount) set to the diaphragm 109, to the lens CPU 102 via the communication terminals 104 and 153. The lens CPU 102 controls the diaphragm driving circuit 115 according to the received F-number and the diaphragm position information from the diaphragm position sensor 114 to drive the diaphragm 109.

The camera CPU 151 transmits an image stabilization start command to the lens CPU 102 via the communication terminals 104 and 153 in response to a half-press operation of the release switch. Receiving the image stabilization start command, the lens CPU 102 controls an IS driving circuit (camera shake correction driving circuit) 116 to hold the correction lens 110 at the control center position. Next, the lens CPU 102 controls a lock driving circuit 117 to drive a mechanical lock 118 to release the locked state. Thereafter, the lens CPU 102 controls the IS driving circuit 116 according to the detection result of a camera shake detecting circuit 119 to drive the correction lens 110 for the image stabilization.

The camera CPU 151 drives the shutter 163 according to the full press operation of the release switch, and guides the light flux from the imaging optical system to the image sensor 162 for imaging. The camera CPU 151 generates image data based on the output from the image sensor 162 and records it on a recording medium. The captured image is a still image if the still image capturing mode is selected and a motion image if the motion image capturing mode is selected according to the setting of a camera GUI unit including the display unit 164 and the camera user interface unit 165. Alternatively, a motion image recording start button may be separately provided, and the motion image recording may be started when the motion image recording start button is pressed.

Figure 2:
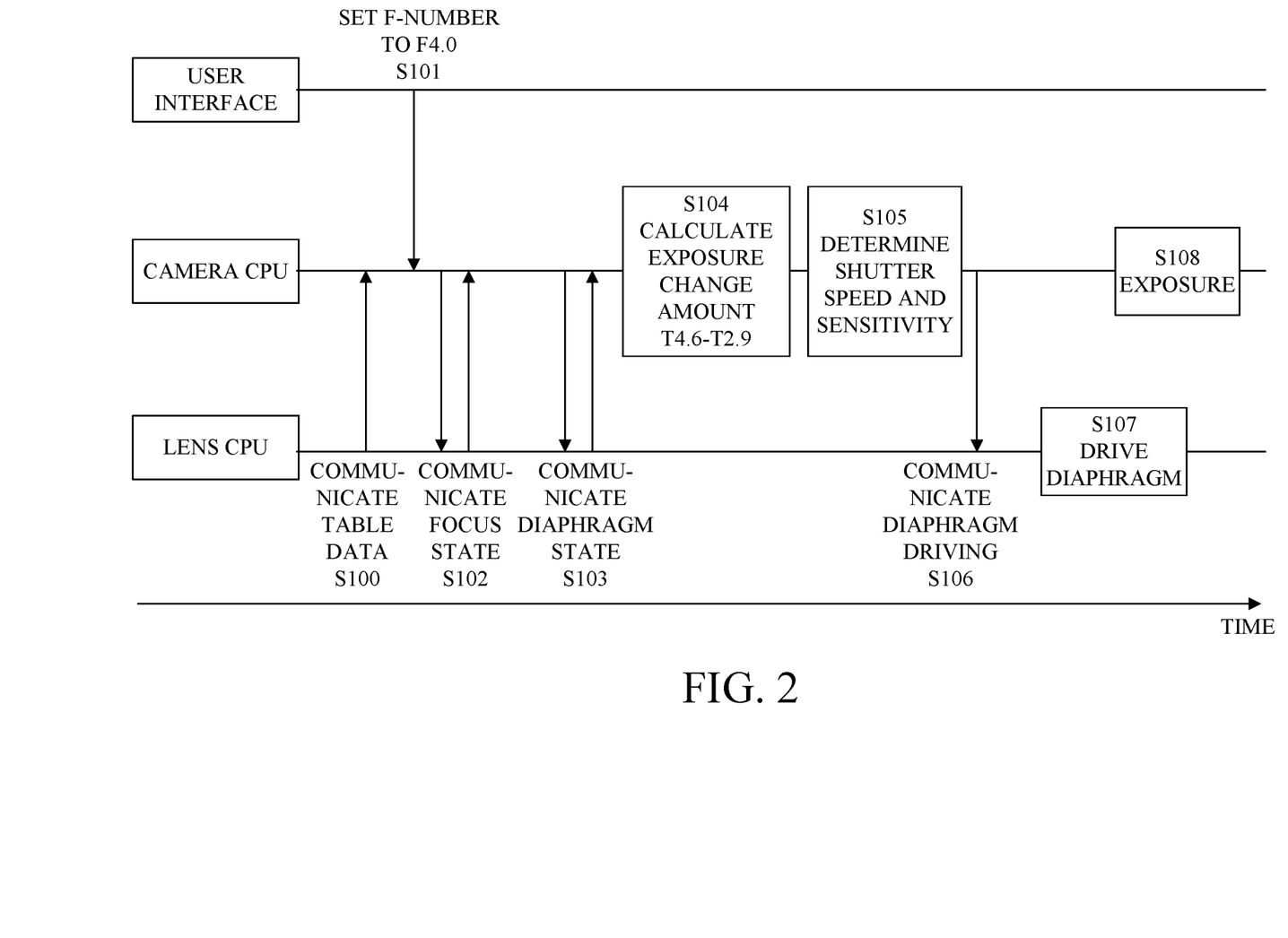
FIG. 2 illustrates an illustrative communication between a camera and an interchangeable lens when an aperture priority mode is set.
Figure 3:
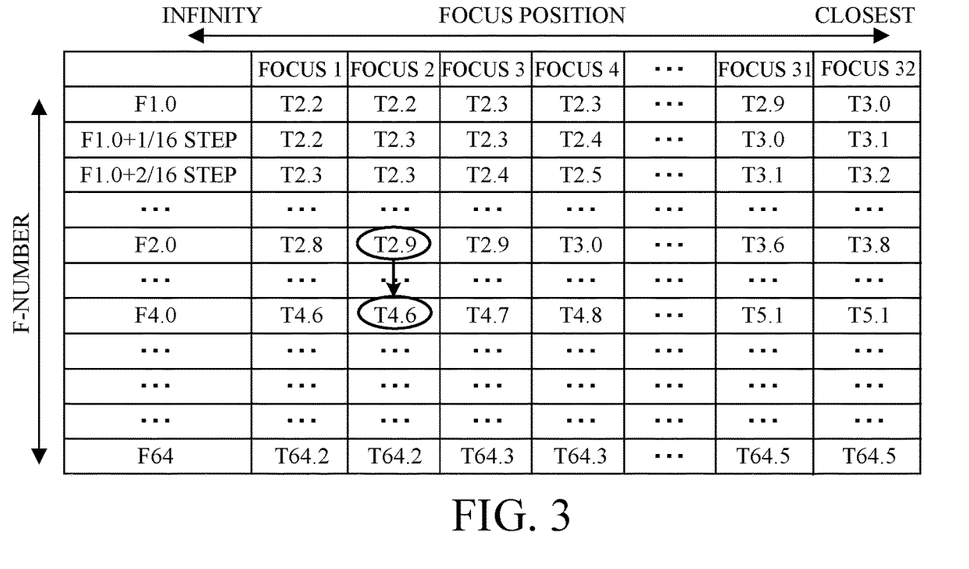
FIG. 3 shows illustrative table data for converting an F-number into a T-number according to the first embodiment.

Referring now to FIGS. 2 and 3, a description will be given of an aperture control in imaging in the aperture priority mode. The aperture priority mode is a mode in which the user designates a favorite F-number. In this case, the camera CPU 151 determines the light amount corresponding to the designated F-number, and performs the exposure based on the shutter speed corresponding to the light amount.

FIG. 2 illustrates an illustrative information communication between the camera 150 and the interchangeable lens 101 when the aperture priority mode is set. FIG. 3 shows illustrative table data (first table data) for converting the F-number transmitted from the interchangeable lens 101 into the T-number. The table data in FIG. 3 is table data used to find the T-number based on the focus position and the F-number. The left column in FIG. 3 indicates the F-number, and the upper row indicates the focus position. The focus position is divided into the required number from infinity to the closest. This division may be an equal division or a division in consideration of the optical performance. In this embodiment, in an example, it is divided into 32 parts.

In the step S100, the table data in FIG. 3 is transmitted from the transmitter 102*b* to the acquisition unit 151*a* in the initial communication between the camera 150 and the interchangeable lens 101. The data regarding the number of divisions (the number of focus positions) is also transmitted from the transmitter 102*b* to the acquisition unit 151*a* prior to the transmission of the table data shown in FIG. 3 in the initial communication between the camera 150 and the interchangeable lens 101.

In the step S101, the user sets the F-number using the lens user interface unit 120, the camera user interface unit 161, and the like. In this embodiment, the F-number is set to F4.0.

In the step S102, the imaging operation starts when the user operates a release switch or the like. After the imaging operation starts, the camera CPU 151 communicates with the lens CPU 102 and receives the state (focus state) of the focus lens 107 (or performs the focus state communication). The focus state includes current focus position information. The current focus position information is information indicating any of a predetermined number of divided sections in the focusable range from infinity to the closest. In this embodiment, the camera CPU 151 receives Focus2 as the focus position information.

In the step S103, the camera CPU 151 communicates with the lens CPU 102 and receives the state (aperture state) of the diaphragm 109 (or communicates the aperture state). The aperture state includes the F-number currently set for the diaphragm 109, F-number data serving as reference for photometry, and the like. In this embodiment, the camera CPU 151 receives F2.0 as the F-number currently set for the diaphragm 109.

In the step S104, the determination unit 151b calculates a change amount of the T-number when the currently set F-number is changed to the F-number set by the user using the table data of FIG. 3. In this embodiment, since the current focus position is Focus2 and the currently set F-number is F2.0, the current T-number is derived as T2.9 from the table data in FIG. 3. Next, the T-number when the focus position is Focus2 and the F-number is F4.0 is derived from T4.6 based on the table data of FIG. 3. As a result, by changing the F-number from F2.0 to F4.0, it is derived that the T-number changes from T2.9 to T4.6.

In the step S105, the determination unit 151b determines the shutter speed and sensitivity at which the exposure is optimal using the change amount of the T-number derived in the step S104.

In the step S106, the camera CPU 151 communicates with the lens CPU 102 (or performs an aperture drive communication) in order to drive the diaphragm 109 so as to obtain the F-number (F4.0 in this embodiment) set by the user.

In the step S107, the lens CPU 102 drives the diaphragm 109 based on the aperture drive command received from the camera CPU 151.

In the step S108, the camera 150 opens the shutter 163 and starts the exposure.

As described above, by using the table data for converting the F-number into the T-number, this embodiment can execute the aperture control in imaging in the aperture priority mode at a high speed. Thus, the frame rate during continuous imaging can be increased.

The imaging system disclosed in JP 10-268382 converts the F-number set by the user into a different F-number in order to maintain the exposure adjustment, so that imaging is different from the setting of the depth of field expected by the user. In the imaging system disclosed in JP 10-268382, the light amount tends to be narrower than the F-number set by the user, and the blur effect expected by the user cannot be obtained. On the other hand, the configuration according to this embodiment can obtain the T-number from the F-number at a high speed, determines the shutter speed and sensitivity using the T-number during imaging, and can capture an image at a depth of field of the F-number set by the user and with a proper blur effect.

Figure 4:
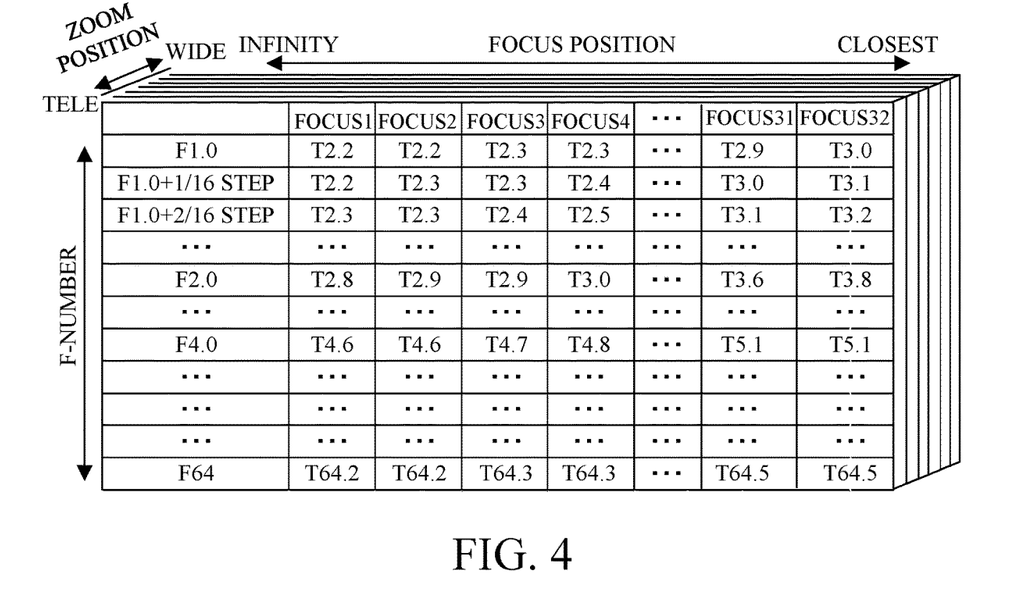
FIG. 4 shows other illustrative table data for converting the F-number into the T-number according to the first embodiment.

This embodiment performs an aperture control using the table data in FIG. 3 in imaging in the aperture priority mode, but may use the table data in FIG. 4. In FIG. 4, the zoom position information is included in the parameters. When the table data of FIG. 4 is used, the zoom position information may be information indicating any of a predetermined number of divided sections in the zoomable range from the wide-angle end to the telephoto end. In this case, in the initial communication between the camera 150 and the interchangeable lens 101, data relating to the number of divisions of the zoomable range is also transmitted from the transmitter 102b to the acquisition unit 151a prior to the transmission of the table data illustrated in FIG. 3.

Figure 5:
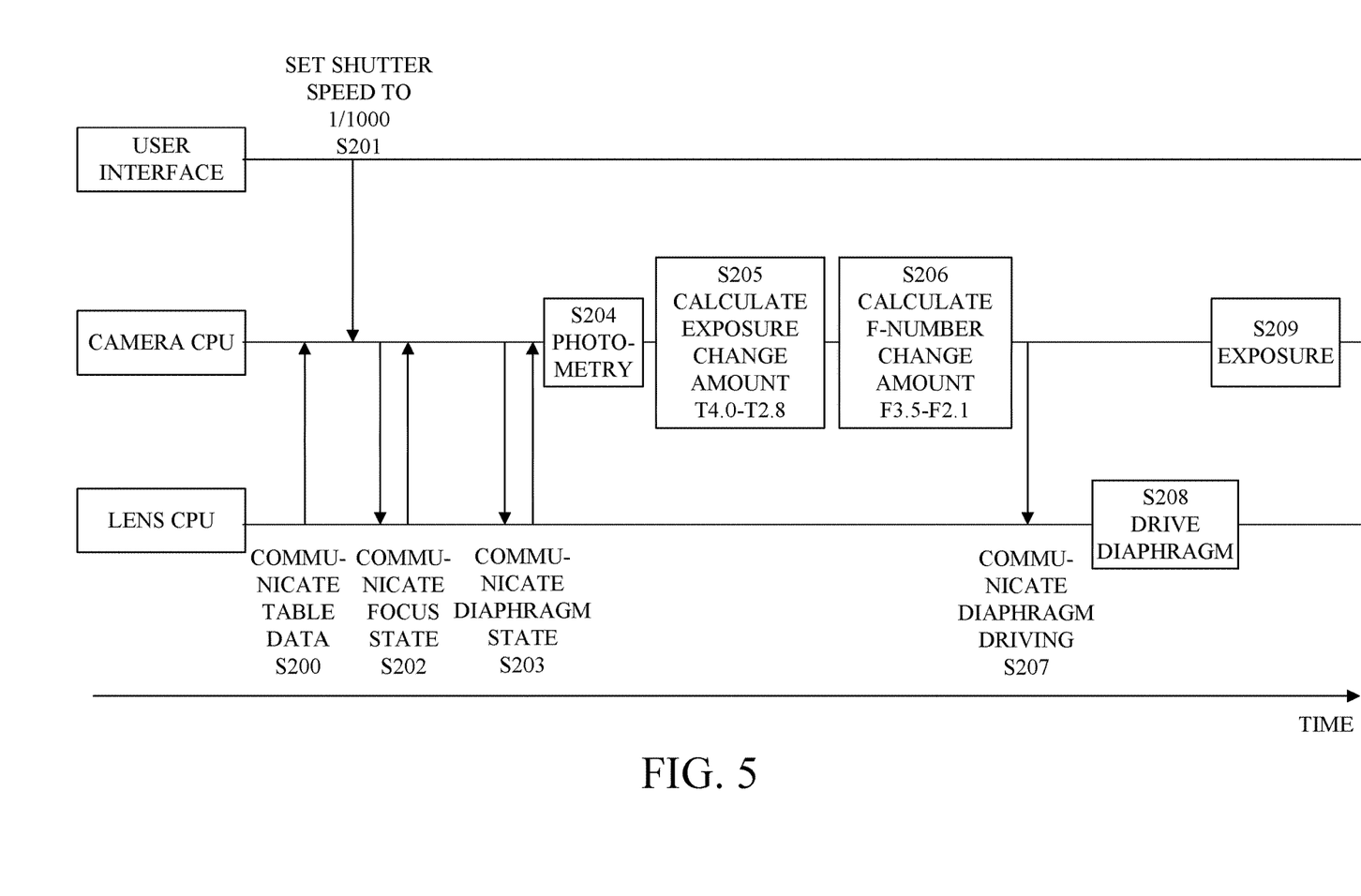
FIG. 5 illustrates an illustrative communication between the camera and the interchangeable lens when a shutter speed priority mode is set.
Figure 6:
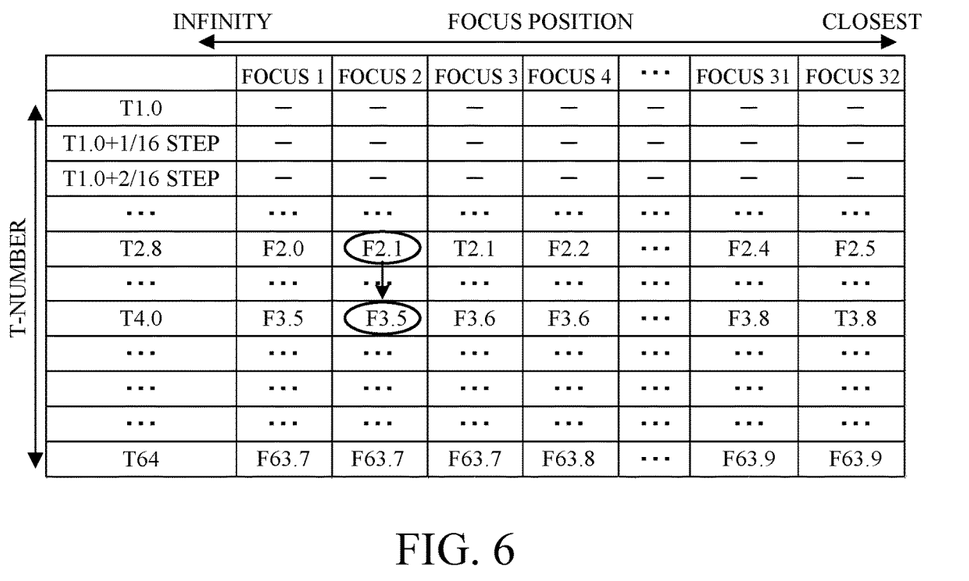
FIG. 6 shows illustrative table data for converting the T-number into the F-number according to the first embodiment.

Referring now to FIGS. 5 and 6, a description will be given of an aperture control in imaging in the shutter speed priority mode. The shutter speed priority mode is a mode in which the user specifies a favorite shutter speed. In this case, the camera CPU 151 determines the light amount for realizing the designated shutter speed, and transmits the F-number corresponding to the light amount to the lens CPU.

FIG. 5 illustrates an illustrative information communication between the camera 150 and the interchangeable lens 101 when the shutter speed priority mode is set. FIG. 6 shows table data (second table data) for converting the T-number into the F-number.

In the step S200, the table data in FIG. 6 is transmitted from the transmitter 102b to the acquisition unit 151a in the initial communication between the camera 150 and the interchangeable lens 101.

In the step S201, the user sets the shutter speed to 1/1000.

In the step S202, when the user operates a release switch or the like, the imaging operation starts. After the imaging operation starts, the camera CPU 151 communicates with the lens CPU 102 and receives the state (focus state) of the focus lens 107 (or performs the focus state communication). In this embodiment, the camera CPU 151 receives Focus2 as the focus position information.

In the step S203, the camera CPU 151 communicates with the lens CPU 102 and receives the state (aperture state) of the diaphragm 109 (or performs the aperture state communication).

In the step S204, the photometric sensor 166 measures the light amount incident on the current image sensor 162 (performs the photometry) based on the aperture information received in the step S203. In this embodiment, the current T-number is measured as T2.8.

In the step S205, the determination unit 151b calculates an optimum exposure change amount for imaging when the shutter speed is 1/1000 from the light amount value acquired in the step S204 and the setting during the photometry. In this embodiment, the determination unit 151b calculates that the T-number changes from T2.8 to T4.0.

In the step S206, the determination unit 151b determines the F-number that provides the optimum exposure for imaging from the current F-number using the table data in FIG. 6. In this embodiment, it is derived that the F-number changes from F2.1 to F3.5 by changing the T-number from T2.8 to T4.0.

In the step S207, the camera CPU 151 communicates with the lens CPU 102 to drive the diaphragm 109 so as to obtain the F-number determined in the step S206 (or perform the aperture drive communication).

In the step S208, the lens CPU 102 drives the diaphragm 109 based on the aperture drive command received from the camera CPU 151.

In the step S209, the camera 150 opens the shutter 163 and starts the exposure.

As described above, using the table data for converting the T-number into the F-number, this embodiment can execute the aperture control at a high speed in imaging in the shutter speed priority mode. Therefore, the frame rate during continuous imaging can be increased.

Figure 7:
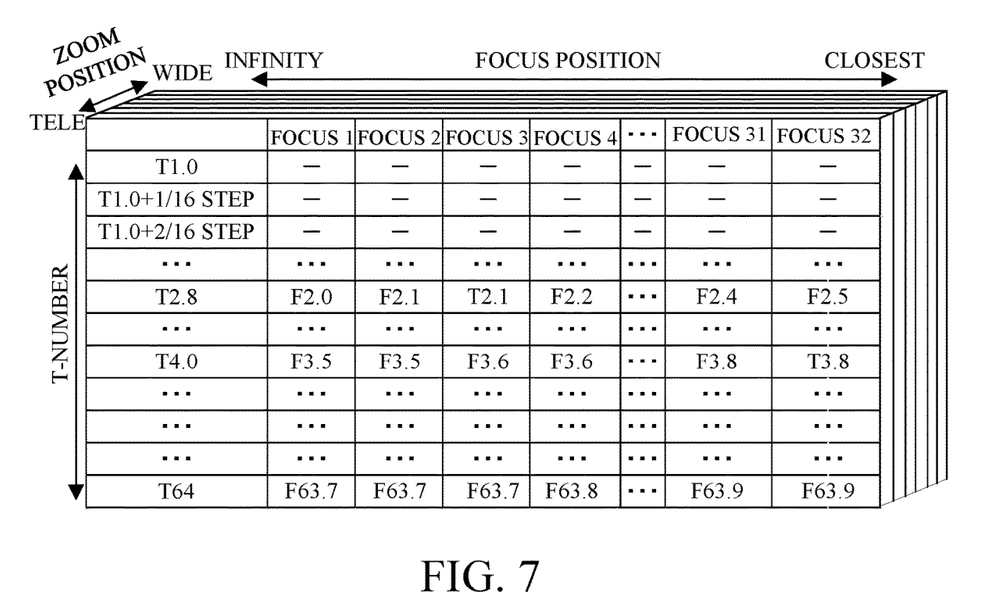
FIG. 7 shows other illustrative table data for converting the T-number into the F-number according to the first embodiment.

In imaging in the shutter speed priority mode, this embodiment performs an aperture control using the table data in FIG. 6, but may use the table data in FIG. 7. In FIG. 7, the zoom position information is included in the parameters. The zoom position information may be the same as that described in FIG. 4. Thus, when the table data of FIG. 7 is used, data regarding the number of zoom positions can also be transmitted from the transmitter 102b to the acquisition unit 151a in the initial communication between the camera 150 and the interchangeable lens 101.

As described above, using a plurality of data indicating the relationship between the F-number and the T-number, this embodiment can perform the aperture control at a high speed even in the shutter speed priority mode or even in imaging in the aperture priority mode. Therefore, the frame speed during continuous imaging can be increased.

This embodiment has described a method in which the camera 150 acquires a plurality of data by transmitting a plurality of data indicating the relationship between the F-number and the T-number from the interchangeable lens 101 to the camera 150. The application scope of the present invention is not limited to this embodiment. For example, the camera 150 may acquire the plurality of data by downloading from a personal computer or the like through a network line.

In this embodiment, the user sets the F-number, the shutter speed, and the like via the user interface unit 161, but the scope of application of the present invention is not limited to this embodiment. For example, the F-number, shutter speed, and the like may be set via an operation unit such as a button or an operation ring provided on the interchangeable lens 101 or an adapter disposed between the interchangeable lens 101 and the camera 150. However, when the operation unit is provided to the interchangeable lens 101 or the adapter, the one having the operation unit notifies the camera 150 of the set number via the communication.

Second Embodiment

Since the camera system 1 of this embodiment has the same configuration as the camera system described in the first embodiment, a detailed description thereof will be omitted. This embodiment will describe only part different from the first embodiment.

Figure 8:
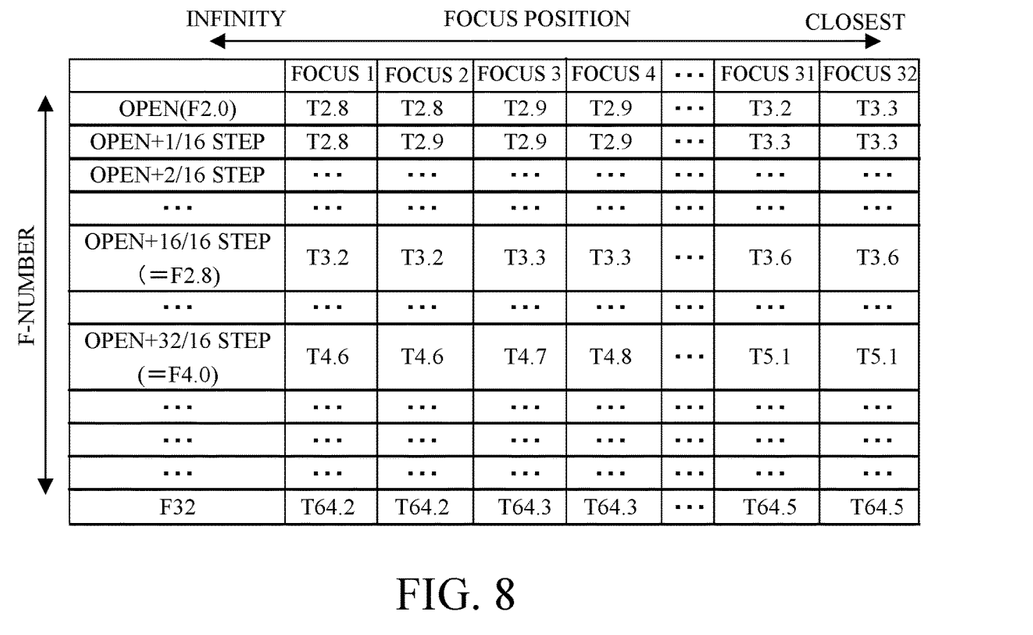
FIG. 8 shows illustrative table data for converting the F-number into the T-number according to a second embodiment.

Referring now to FIGS. 2 and 8, a description will be given of the aperture control in imaging in the aperture priority mode. The aperture priority mode is a mode in which the user designates a favorite F-number. In this case, the camera CPU 151 determines the light amount corresponding to the designated F-number, and performs the exposure based on the shutter speed corresponding to the light amount.

FIG. 8 shows illustrative table data (first table data) for converting the F-number transmitted from the interchangeable lens 101 into a T-number. The table data in FIG. 8 is table data from which the T-number can be derived from the focus position and the F-number. The left column in FIG. 8 indicates the F-number, and the upper row indicates the focus position. The focus position is divided into a required number from infinity to the closest. This division may be an equal division or a division in consideration of the optical performance. In this embodiment, in an example, it is divided into 32 parts.

In the step S100, the table data of FIG. 8 is transmitted from the transmitter 102*b* to the acquisition unit 151*a* in the initial communication between the camera 150 and the interchangeable lens 101. Data relating to the number of divisions (the number of focus positions) is also transmitted from the transmitter 102*b* to the acquisition unit 151*a* prior to the transmission of the table data shown in FIG. 8 in the initial communication between the camera 150 and the interchangeable lens 101.

Figure 9:
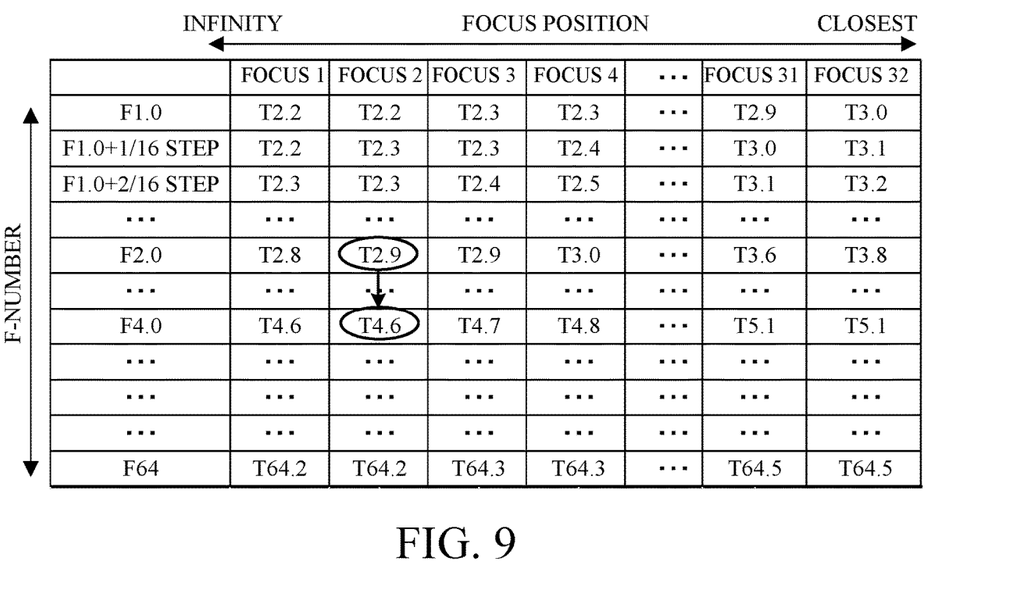
FIG. 9 is table data for converting the F-number into the T-number according to a comparative example.

In the table data of FIG. 8, the F-number parameter is a relative value for the open F-number (reference value). Thereby, it is only necessary to have an optimum data amount for each lens apparatus to be used, and a data amount can be significantly reduced in comparison with a case where the F-number parameter is set to an absolute value as in the table data in FIG. 9. For example, in the table data of FIG. 9, the F-number parameters are F1.0 to F64, and the number of change steps (stops) is assumed to be 12. Considering 16 divisions per step, data of 192 (=12×16) divisions are required. In other words, this data amount is required regardless of the lens apparatus to be used. On the other hand, the table data in FIG. 8 assumes that the open F-number is F2.0 and the number of narrowing steps is 8, and the data of 128 (=8×16) divisions is sufficient. Therefore, the data amount can be reduced by 25%.

In the step S101, the user sets the F-number using the lens user interface unit 120, the camera user interface unit 161, and the like. This embodiment sets the F-number to F4.0.

In the step S102, the imaging operation starts when the user operates the release switch or the like. After the imaging operation starts, the camera CPU 151 communicates with the lens CPU 102 and receives the state (focus state) of the focus lens 107 (or performs the focus state communication). The focus state includes current focus position information. In this embodiment, the camera CPU 151 receives Focus2 as the focus position information.

In the step S103, the camera CPU 151 communicates with the lens CPU 102 and receives the state (aperture state) of the diaphragm 109 (or performs the aperture state communication). The aperture state includes the F-number currently set for the diaphragm 109, F-number data serving as a photometric reference, and the like. In this embodiment, the camera CPU 151 receives F2.0 as the F-number currently set for the diaphragm 109.

In the step S104, the determination unit 151*b* calculates the change amount of the T-number when the currently set F-number is changed to the F-number set by the user using the table data in FIG. 8. In this embodiment, first, since the current focus position is Focus2 and the currently set F-number is F2.0, the current T-number is derived as T2.9 from the table data of FIG. 8. Next, the T-number is derived from T4.6 and the table data of FIG. 8 when the focus position is Focus2 and the F-number is F4.0. As a result, by changing the F-number from F2.0 to F4.0, it is derived that the T-number changes from T2.9 to T4.6.

In the step S105, the determination unit 151*b* determines the shutter speed and sensitivity at which the exposure is optimal using the change amount of the T-number derived in the step S104.

In the step S106, the camera CPU 151 communicates with the lens CPU 102 (or performs the aperture drive communication) in order to drive the diaphragm 109 so as to obtain the F-number (F4.0 in this embodiment) set by the user.

In the step S107, the lens CPU 102 drives the diaphragm 109 based on the aperture drive command received from the camera CPU 151.

In the step S108, the camera 150 opens the shutter 163 and starts the exposure.

As described above, using the table data for converting the F-number into the T-number, this embodiment can execute the aperture control in imaging in the aperture priority mode at a high speed. Thus, the frame rate during continuous imaging can be increased.

Thus, the interchangeable lens 101 may store an optimum data amount for each lens apparatus to be used, and can reduce a data amount to be stored in comparison with a case where an absolute value is set to the F-number parameter. Further, it can reduce a data amount transmitted to the camera 150 and shorten the data transmission time. The camera 150 can reduce a storage capacity for temporarily storing data acquired from the interchangeable lens 101, or increase an execution speed of processing using the table data acquired from the interchangeable lens 101.

Figure 10:
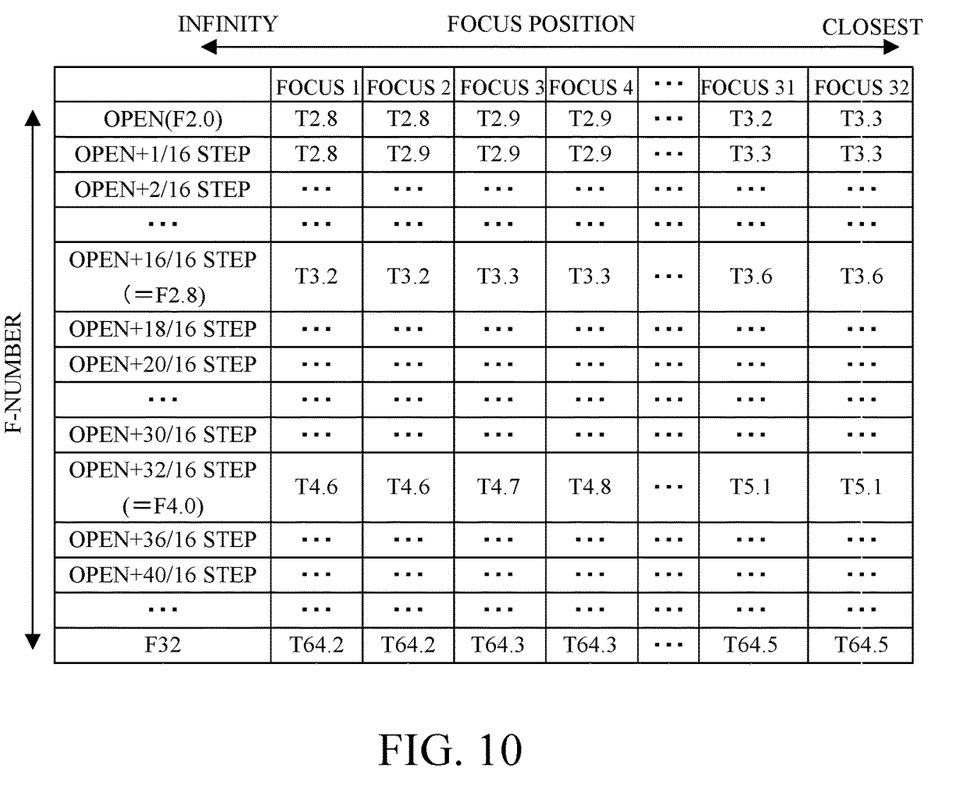
FIG. 10 shows other illustrative table data for converting the F-number into a T-number according to the second embodiment.

Instead of the table data in FIG. 8, table data may be used in which the relative value interval changes according to the light amount adjustment range. In the blur optical system, the relationship between the F-number and the T-number in a region where the diaphragm 109 is close to the open state tends to significantly deviate from the linearity. On the other hand, since the relationship between the F-number and the T-number in the region where the diaphragm 109 is greatly narrowed approaches to the linearity, the value between them can be linearly interpolated even if the number of divisions is reduced (even if the interval between relative values is increased). Accordingly, instead of FIG. 8, for example, the table data of FIG. 10 in which the number of division steps decreases as the aperture amount increases may be used. The table data in FIG. 10 sets 1/16 step resolution from the open state to the 16/16 step, 1/8 step resolution from the 16/16 step to the 32/16 step, and 1/4 step resolution from 32/16 step to the final small aperture F32. Using the table data, the data amount can be further reduced.

Figure 11:
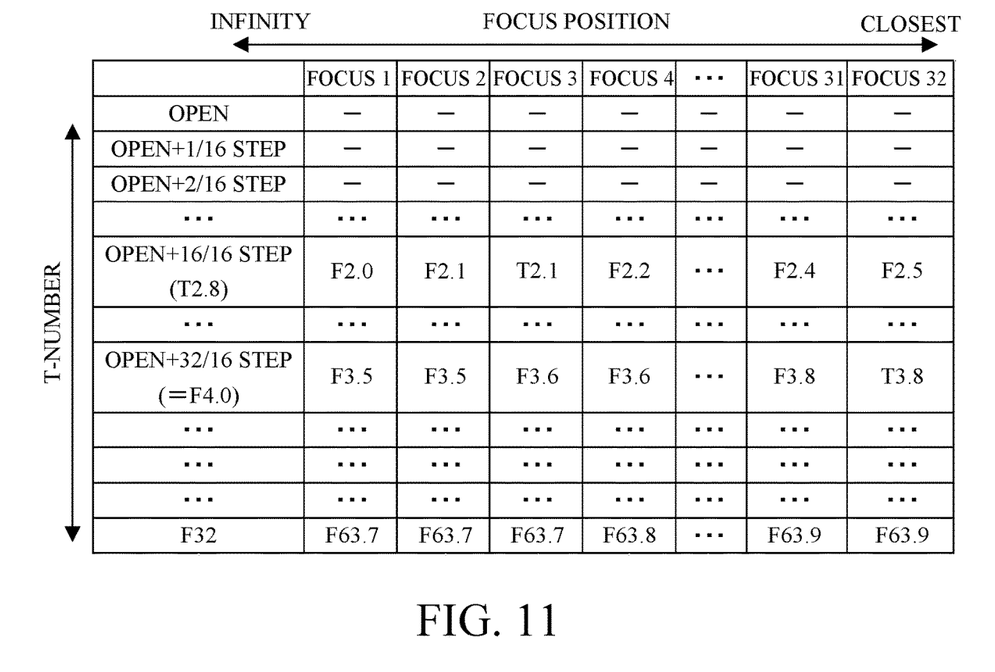
FIG. 11 shows illustrative table data for converting the T-number into the F-number according to the second embodiment.

Referring now to FIGS. 5 and 11, a description will be given of the aperture control in imaging in the shutter speed priority mode. The shutter speed priority mode is a mode in which the user specifies a favorite shutter speed. In this case, the camera CPU 151 determines the light amount for realizing the designated shutter speed, and transmits the F-number corresponding to the light amount to the lens CPU.

FIG. 11 shows table data (second table data) for converting the T-number into the F-number.

Figure 12:
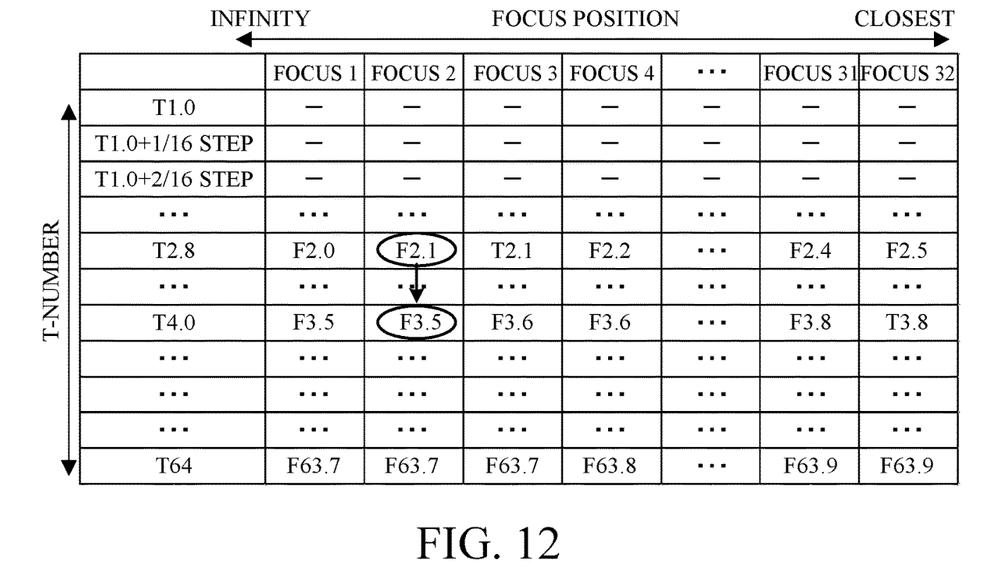
FIG. 12 shows table data for converting the T-number into the F-number according to a comparative example.

In the table data of FIG. 11, the parameter of the T-number is a relative value for the maximum T-number (T-number in the open F-number, reference value). Thereby, it is only necessary to have an optimum data amount for each lens apparatus to be used, and the data amount is significantly reduced in comparison with a case where an absolute value is set to the T-number parameter as in the table data of FIG. 12.

In the step S200, the table data of FIG. 11 is transmitted from the transmitter 102b to the acquisition unit 151a in the initial communication between the camera 150 and the interchangeable lens 101.

In the step S201, the user sets the shutter speed to 1/1000.

In the step S202, when the user operates the release switch or the like, the imaging operation starts. After the imaging operation starts, the camera CPU 151 communicates with the lens CPU 102 and receives the state (focus state) of the focus lens 107 (or performs the focus state communication). In this embodiment, the camera CPU 151 receives Focus2 as the focus position information.

In the step S203, the camera CPU 151 communicates with the lens CPU 102 and receives the state (aperture state) of the diaphragm 109 (or performs the aperture state communication).

In the step S204, the photometric sensor 166 measures the light amount incident on the current image sensor 162 (or performs the photometry) based on the aperture information received in the step S203, etc. In this embodiment, the current T-number is measured as T2.8.

In the step S205, the determination unit 151b calculates an optimum exposure change amount in imaging when the shutter speed is 1/1000, based on the light amount value acquired in the step S204 and the setting during the photometry. In this embodiment, the determination unit 151b calculates that the T-number changes from T2.8 to T4.0.

In the step S206, the determination unit 151b determines the F-number that provides the optimum exposure for imaging from the current F-number using the table data in FIG. 11. This embodiment can derive that the F-number changes from F2.1 to F3.5 by changing the T-number from T2.8 to T4.0.

In the step S207, the camera CPU 151 communicates with the lens CPU 102 to drive the diaphragm 109 so as to obtain the F-number determined in the step S206 (F3.5 in this embodiment) (or perform the aperture drive communication).

In the step S208, the lens CPU 102 drives the diaphragm 109 based on the aperture drive command received from the camera CPU 151.

In the step S209, the camera 150 opens the shutter 163 and starts the exposure.

As described above, using the table data for converting the T-number into the F-number, this embodiment can execute the aperture control at a high speed in imaging in the shutter speed priority mode. Thus, the frame rate during continuous imaging can be increased.

Hence, the interchangeable lens 101 may store an optimum data amount for each lens apparatus to be used, and reduce the data amount to be stored in comparison with a case where an absolute value is set to the F-number parameter. It can reduce the data amount transmitted to the camera 150 and shorten the data transmission time. The camera 150 can reduce the storage capacity for temporarily storing data acquired from the interchangeable lens 101, or increase the execution speed of processing using the table data acquired from the interchangeable lens 101.

This embodiment has described the method in which the camera 150 acquires data by transmitting the data indicating the relationship between the F-number and the T-number from the interchangeable lens 101 to the camera 150, but the application scope of the present invention is not limited to this embodiment. For example, the camera 150 may acquire the data by downloading from a personal computer or the like through a network line.

This embodiment has described a case where the user sets the F-number, the shutter speed, and the like via the user interface unit 161, but the application scope of the present invention is not limited to this embodiment. For example, the F-number, shutter speed, and the like may be set via an operation unit such as a button and an operation ring provided on the interchangeable lens 101 or an adapter disposed between the interchangeable lens 101 and the camera 150. When the operation unit is provided in the interchangeable lens 101 or the adapter, the one having the operation unit notifies the camera 150 of the set number via the communication.

This embodiment uses the open F-number or the maximum T-number as the reference value, but the application scope of the present invention is not limited to this embodiment. An F-number other than the open F-number may be used as the reference value, or a T-number other than the maximum T-number may be used as the reference value.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2019-023156, filed on Feb. 13, 2019, and 2019-023190, filed on Feb. 13, 2019, each of which is hereby incorporated by reference herein in its entirety.

What is claimed is:

1. An imaging apparatus to which a lens apparatus is detachably attachable, the lens apparatus including an imaging optical system that includes an apodization optical element whose transmittance changes from a center in a radial direction, the imaging apparatus comprising:
   an imager configured to capture an object image formed by the imaging optical system and to output image data;
   a photometric unit configured to measure a light amount incident on the imager;
   an acquisition unit configured to acquire a plurality of data indicating a relationship between the light amount incident on the imager and an adjustment amount set in a light amount adjustment unit that is included in the imaging optical system and adjusts the light amount incident on the imager; and
   a determination unit configured to determine an exposure condition using the data acquired by the acquisition unit,
   wherein the plurality of data includes first table data configured to provide a change amount of the light amount incident on the imager based on a change amount of the adjustment amount, and second table data configured to provide the change amount of the adjustment amount based on the change amount of the light amount incident on the imager.

2. The imaging apparatus according to claim 1, wherein the acquisition unit acquires the plurality of data in an initial communication between the imaging apparatus and the lens apparatus.

3. The imaging apparatus according to claim 1, wherein the first table data is configured to provide the change amount of the light amount incident on the imager further based on information on a focus position of a focus lens unit included in the imaging optical system, and the second table data is configured to provide the change amount of the adjustment amount further based on the information on the focus position.

4. The imaging apparatus according to claim 3, wherein the information on the focus position includes information indicating any of a predetermined number of divided sections in a focusable range in the imaging optical system, and
   wherein the acquisition unit acquires data relating to the number of divisions of the focusable range in an initial communication between the imaging apparatus and the lens apparatus.

5. The imaging apparatus according to claim 1, wherein the first table data is configured to provide the change amount of the light amount incident on the imager further based on information on a focus position of a focus lens unit included in the imaging optical system and information on a zoom position of a zoom lens unit included in the imaging optical system, and the second table data is configured to provide the change amount of the adjustment amount further based on the information on the focus position and the information on the zoom position.

6. The imaging apparatus according to claim 5, wherein the information on the focus position includes information indicating any of a predetermined number of divided sections in a focusable range in the imaging optical system,
   wherein the information on the zoom position includes information indicating any of a predetermined number of divided sections in a zoomable range in the imaging optical system, and
   wherein the acquisition unit acquires data relating to the number of divisions of the focusable range and the number of divisions of the zoomable range in an initial communication between the imaging apparatus and the lens apparatus.

7. The imaging apparatus according to claim 1, wherein when the adjustment amount is set through an operation unit, the determination unit determines at least one of a shutter speed and sensitivity as the exposure condition using the first table data, and when the shutter speed is set via the operation unit, the determination unit determines the adjustment amount as the exposure condition using the second table data.

8. The imaging apparatus according to claim 1, wherein in the plurality of data, one of the adjustment amount and the light amount incident on the imager is a relative value relative to a predetermined reference value.

9. The imaging apparatus according to claim 8, wherein the predetermined reference value is the adjustment amount or the light amount incident on the imager at an open F-number of the imaging optical system.

10. The imaging apparatus according to claim 8, wherein an interval of the relative value varies according to a light amount adjustment range of the light amount adjustment unit.

11. A lens apparatus attachable to and detachable from an imaging apparatus that includes an imager configured to capture an object image and to output image data, and a photometric unit configured to measure a light amount incident on the imager, the lens apparatus comprising:
   an imaging optical system including an apodization optical element whose transmittance changes from a center in a radial direction, and a light amount adjustment unit configured to adjust a light amount incident on the imager; and
   a transmitter configured to transmit, to the imaging apparatus, a plurality of data indicating a relationship between an adjustment amount set in the light amount adjustment unit and a light amount incident on the imager, wherein the plurality of data includes first table data configured to provide a change amount of the light amount incident on the imager based on a change amount of the adjustment amount, and second table data configured to provide the change amount of the adjustment amount based on the change amount of the light amount incident on the imager.

12. The lens apparatus according to claim 11, wherein the transmitter transmits the plurality of data to the imaging apparatus in an initial communication between the imaging apparatus and the lens apparatus.

13. The lens apparatus according to claim 11, wherein the imaging optical system includes a focus lens unit, and wherein the first table data is configured to provide the change amount of the light amount incident on the imager further based on information on a focus position of a focus lens unit included in the imaging optical system, and the second table data is configured to provide the change amount of the adjustment amount further based on the information on the focus position.

14. The lens apparatus according to claim 13, wherein the information on the focus position includes information indicating any of a predetermined number of divided sections in a focusable range in the imaging optical system, and wherein the transmitter transmits data relating to the number of divisions of the focusable range in an initial communication between the imaging apparatus and the lens apparatus.

15. The lens apparatus according to claim 11, wherein the imaging optical system includes a focus lens unit and a zoom lens unit, and wherein the first table data is configured to provide the change amount of the light amount incident on the imager further based on information on a focus position of a focus lens unit included in the imaging optical system and information on a zoom position of a zoom lens unit included in the imaging optical system, and the second table data is configured to provide the change amount of the adjustment amount further based on the information on the focus position and the information on the zoom position.

16. The lens apparatus according to claim 15, wherein the information on the focus position includes information indicating any of a predetermined number of divided sections in a focusable range in the imaging optical system, wherein the information on the zoom position includes information indicating any of a predetermined number of divided sections in a zoomable range in the imaging optical system, and wherein the transmitter transmits data relating to the number of divisions of the focusable range and the number of divisions of the zoomable range in an initial communication between the imaging apparatus and the lens apparatus.

17. The lens apparatus according to claim 11, wherein in the plurality of data, one of the adjustment amount and the light amount incident on the imager is a relative value relative to a predetermined reference value.

18. The imaging apparatus according to claim 17, wherein the predetermined reference value is the adjustment amount or the light amount incident on the imager at an open F-number of the imaging optical system.

19. A camera system comprising:

an imaging optical system including an apodization optical element whose transmittance changes from a center in a radial direction, and a light amount adjustment unit configured to adjust a light amount incident on the imager;

an imager configured to capture an object image formed by the imaging optical system and to output image data;

a photometric unit configured to measure a light amount incident on the imager;

an acquisition unit configured to acquire a plurality of data indicating a relationship between the light amount incident on the imager and an adjustment amount set in the light amount adjustment unit; and a determination unit configured to determine an exposure condition using the data acquired by the acquisition unit, wherein the plurality of data includes first table data configured to provide a change amount of the light amount incident on the imager based on a change amount of the adjustment amount, and second table data configured to provide the change amount of the adjustment amount based on the change amount of the light amount incident on the imager.

20. A control method of an imaging apparatus to which a lens apparatus is detachably attachable, the lens apparatus including an imaging optical system that includes an apodization optical element whose transmittance changes from a center in a radial direction, the imaging apparatus including an imager configured to capture an object image formed by the imaging optical system and to output image data, and a photometric unit configured to measure a light amount incident on the imager, the control method comprising the steps of:

acquiring a plurality of data indicating a relationship between the light amount incident on the imager and an adjustment amount set in a light amount adjustment unit that is included in the imaging optical system and adjusts the light amount incident on the imager; and determining an exposure condition using the data acquired by the acquisition step, wherein the plurality of data includes first table data configured to provide a change amount of the light amount incident on the imager based on a change amount of the adjustment amount, and second table data configured to provide the change amount of the adjustment amount based on the change amount of the light amount incident on the imager.

* * * * *